United States Patent [19]
Tezuka et al.

[11] Patent Number: 4,767,382
[45] Date of Patent: Aug. 30, 1988

[54] TRANSMISSION RATIO CONTROL SYSTEM FOR A CONTINUOUSLY VARIABLE TRANSMISSION

[75] Inventors: Kazunari Tezuka, Asaka; Hiroshi Tanaka, Tokyo, both of Japan

[73] Assignee: Fuji Jukogyo Kabushiki Kaisha, Tokyo, Japan

[21] Appl. No.: 16,677

[22] Filed: Feb. 18, 1987

[30] Foreign Application Priority Data
Feb. 18, 1986 [JP] Japan ................................ 61-33331

[51] Int. Cl.$^4$ ...................... F16H 11/02; B60K 41/12
[52] U.S. Cl. ........................................ 474/28; 74/866; 364/424.1
[58] Field of Search ............... 474/28, 18; 74/856, 74/861, 865–869; 364/424.1

[56] References Cited
U.S. PATENT DOCUMENTS
4,672,864 6/1987 Morimoto ..................... 474/28 X FOREIGN PATENT DOCUMENTS
59-217051 12/1984 Japan .

Primary Examiner—Thuy M. Bui
Attorney, Agent, or Firm—Martin A. Farber

[57] ABSTRACT

A control system for a continuously variable transmission has a transmission ratio control valve having a spool for controlling oil supplied to a cylinder of a drive pulley to change the transmission ratio. The control system operates to control the transmission ratio in accordance with a desired ratio including a desired overdrive ratio for providing an overdrive transmission ratio. In a low vehicle speed range, the overdrive transmission ratio is controlled to a value slightly larger than the overdrive transmission ratio.

9 Claims, 6 Drawing Sheets

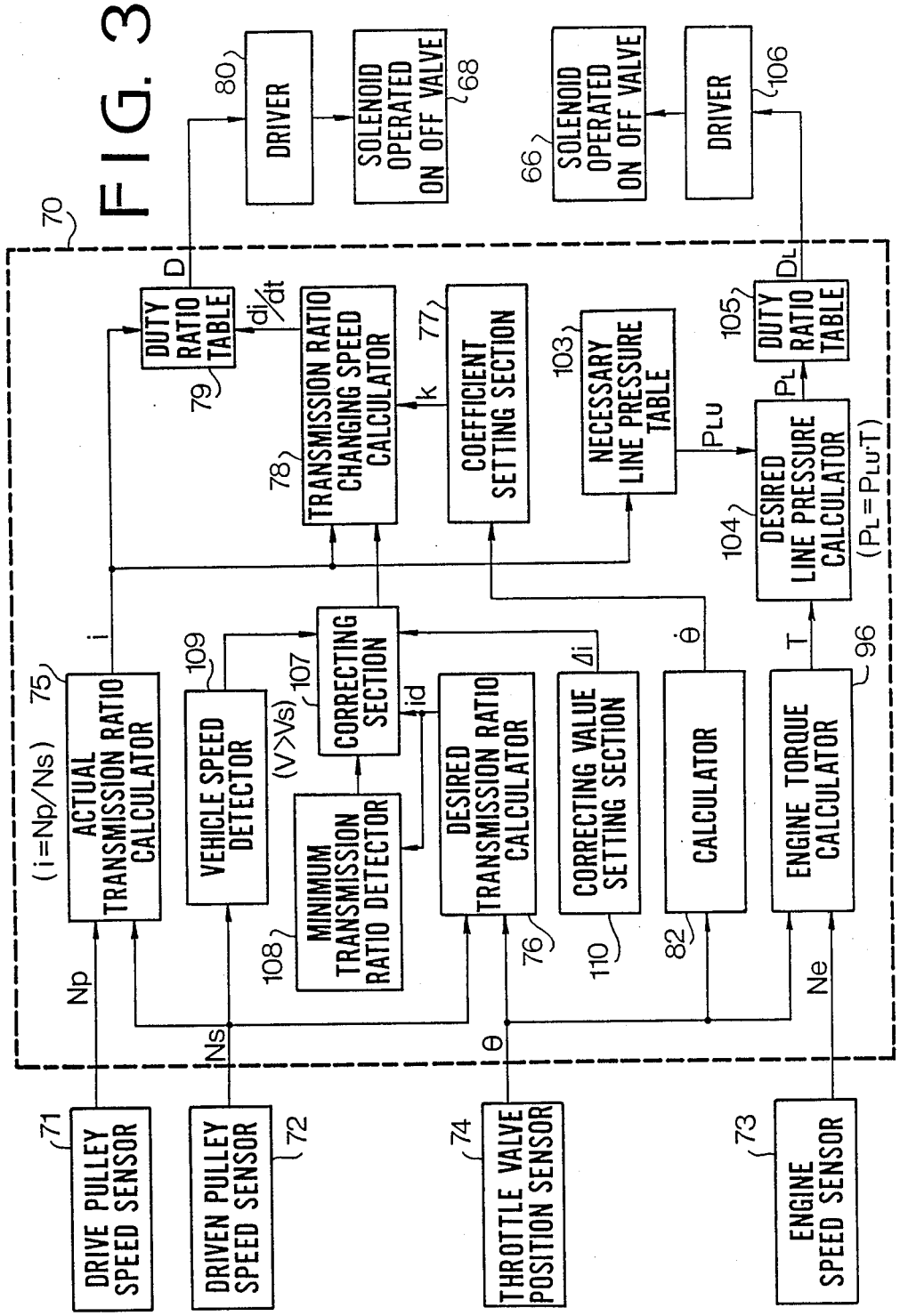

TRANSMISSION RATIO CONTROL SYSTEM FOR A CONTINUOUSLY VARIABLE TRANSMISSION

BACKGROUND OF THE INVENTION

The present invention relates to a control system for a continuously variable belt-drive automatic transmission for a motor vehicle, and more particularly to a system for controlling the transmission ratio at a minimum transmission ratio.

A known control system for a continuously variable belt-drive transmission comprises an endless belt running over a drive pulley and a driven pulley. Each pulley comprises a movable conical disc which is axially moved by a fluid-operated servo device so as to vary the running diameter of the belt on the pulleys in dependency on driving conditions. The system is provided with a hydraulic circuit including a pump for supplying oil to the servo devices, a line pressure control valve and a transmission ratio control valve. Each valve comprises a spool to control the oil supplied to the servo devices.

The transmission ratio control valve operates to control the transmission ratio in accordance with the opening degree of a throttle valve of an engine and the speed. The line pressure control valve is adapted to control the line pressure in accordance with the transmission ratio and the engine speed. The line pressure is controlled to prevent the belt from slipping on the pulleys in order to transmit the output of the engine.

At a minimum transmission ratio (overdrive), as shown in FIG. 6, the ratio ($P_P/P_S$) of oil pressure $P_P$ of the servo device of the drive pulley to oil pressure $P_S$ for the driven pulley is higher than a value ($a$) necessary to keep the overdrive operation. Driving under such a high oil pressure causes an increase of wear of the belt and a delay in downshifting operation from the overdrive.

Japanese Patent Laid Open No. 59-217051 discloses a system for resolving such problems. In the prior art, the overdrive transmission ratio is set to a value lower than a minimum value which is minimum within a controllable range. Such an overdrive transmission ratio can be provided by a feedback control in which the overdrive ratio is set as a desired value. However, if the transmission ratio is controlled by the feedback controlling, hunting of the control system inevitably occurs, which swings the transmission ratio. The fluctuation of the transmission ratio at high vehicle speed causes a variation of engine speed which is unpleasant to the driver.

SUMMARY OF THE INVENTION

The object of the present invention is to provide a system which can eliminate the above-described disadvantages of the continuously variable transmission.

At low vehicle speed, the fluctuation of the transmission ratio does not cause the variation of engine speed, because the variation range of the transmission ratio is smaller than that of high vehicle speed. Accordingly, in the system of the invention, the transmission ratio is controlled to a value close to the overdrive transmission ratio by the feedback controlling operation only in a low vehicle speed range.

According to the present invention, there is provided a control system for a continuously variable transmission for transmitting the power of an internal combustion engine to driving wheels of a motor vehicle through a clutch, having a drive pulley including a hydraulically shiftable disc and a first hydraulic cylinder for shifting the disc, a driven pulley including a hydraulically shiftable disc and a second hydraulic cylinder for operating the disc, a belt engaged with both pulleys, a transmission ratio control valve having ports and a spool, a first hydraulic circuit having a pump for supplying oil to the first and second cylinders through the transmisson ratio control valve. The system comprises detecting means for detecting load on the engine and for producing a load signal, first means responsive to the load signal for producing a desired transmission ratio signal including a desired overdrive transmission ratio signal, second means responsive to the desired transmission ratio signal for shifting the spool of the transmission ratio control valve so as to provide a transmission ratio up to an overdrive transmission ratio, detecting means for detecting speed of the vehicle and producing a vehicle speed signal when the vehicle speed is in a low speed range, third means responsive to the desired overdrive transmission ratio signal and to the vehicle speed signal for producing a corrected desired overdrive transmission ratio signal which is larger than the desired overdrive transmission ratio signal in value of transmission ratio.

The other objects and features of this invention will become understood from the following description with reference to the accompanying drawings.

BRIEF DESCRIPTION OF DRAWINGS

FIG. 3 is a block diagram showing a control unit;

DETAILED DESCRIPTION OF THE PREFERRED EMBODIMENT

Figure 1:
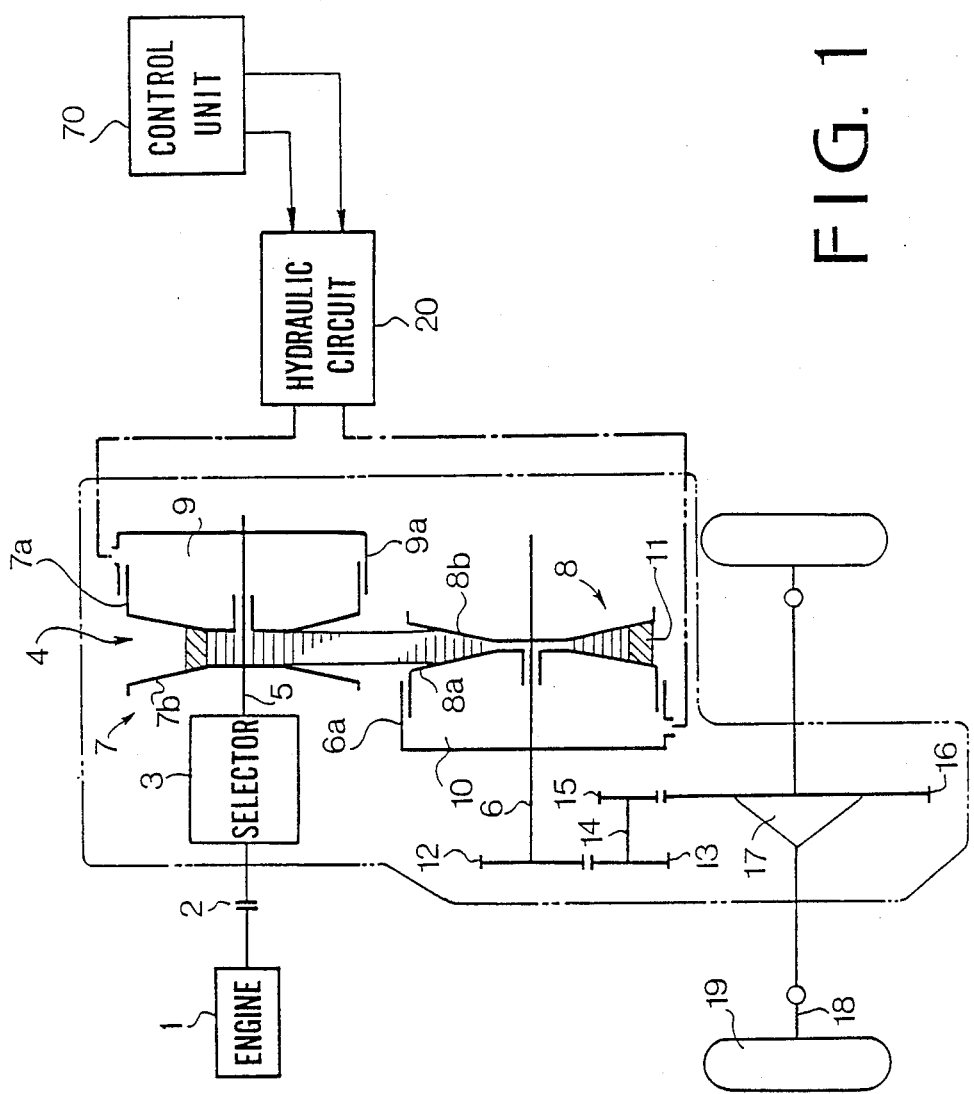
FIG. 1 is a schematic illustration of a continuously variable belt-drive transmission.

Referring to FIG. 1, a motor vehicle is provided with an engine 1, an electromagnetic powder clutch 2 for transmitting the power of the engine to a continuously variable belt-drive transmission 4 through a selector mechanism 3.

The belt-drive transmission 4 has a main shaft 5 and an output shaft 6 provided in parallel with the main shaft 5. A drive pulley (primary pulley) 7 and a driven pulley (secondary pulley) 8 are mounted on shafts 5 and 6 respectively. A fixed conical disc 7b of the drive pulley 7 is integral with the main shaft 5 and an axially movable conical disc 7a is axially slidably mounted on the main shaft 5. The movable conical disc 7a also slides in a cylinder 9a formed on the main shaft 5 to provide a servo device. A chamber 9 of the servo device communicates with a hydraulic circuit 20.

A fixed conical disc 8b of the driven pulley 8 is formed on the output shaft 6 opposite a movable conical disc 8a. The conical disc 8a has a cylindrical portion which is slidably engaged in a cylinder 6a of the output shaft 6 to form a servo device. A chamber 10 of the servo device is also communicated with the control circuit 20. A drive belt 11 engages with the drive pulley 7 and the driven pulley 8.

Secured to the output shaft 6 is a drive gear 12 which engages with an intermediate reduction gear 13 on an intermediate shaft 14. An intermediate gear 15 on the shaft 14 engages with a final gear 16. The rotation of the final gear 16 is transmitted to axles 18 of vehicle driving wheels 19 through a differential 17.

Figure 2A:
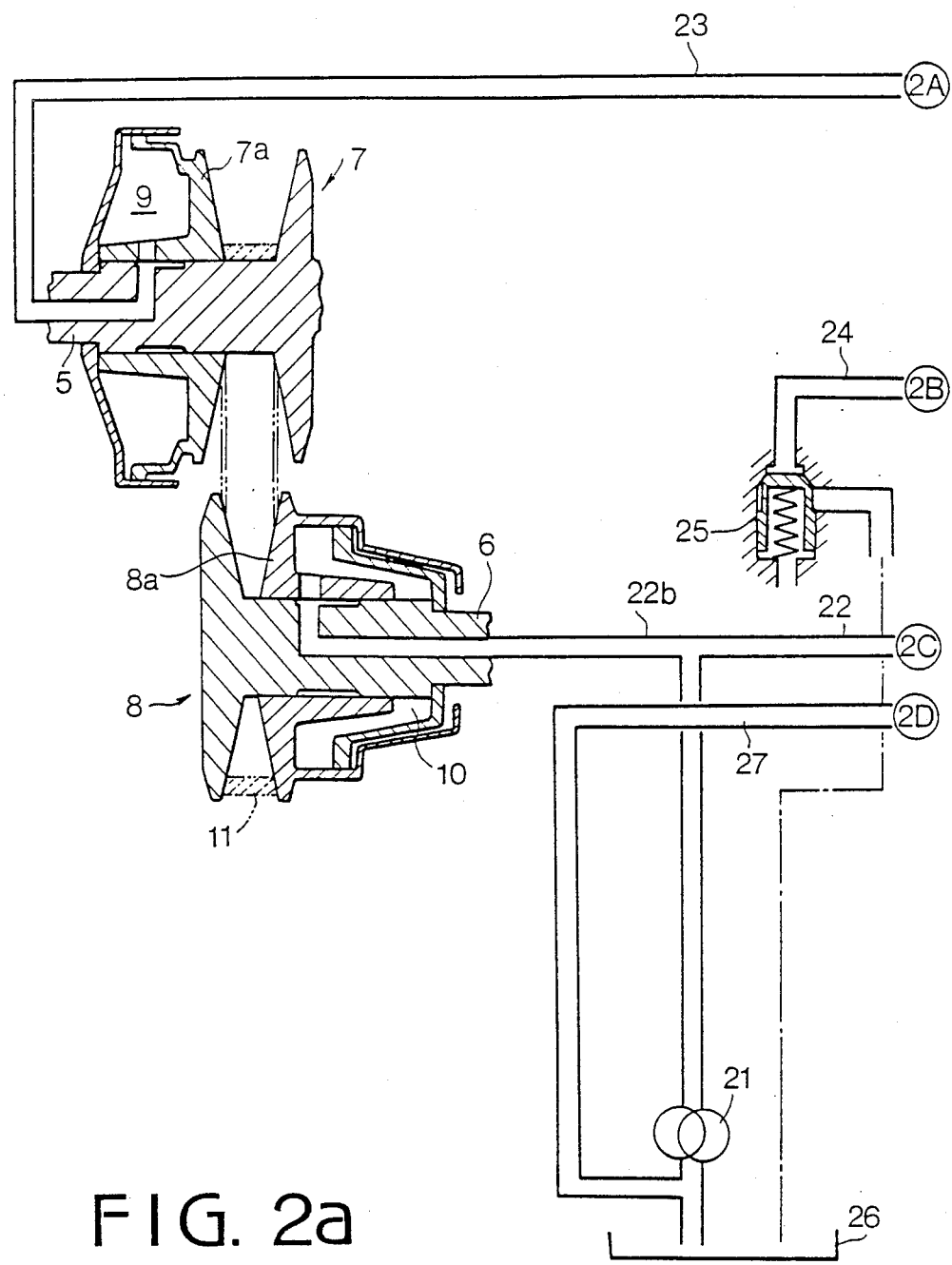
FIGS. 2a and 2b are schematic diagrams showing a control system according to the present invention.
Figure 2B:
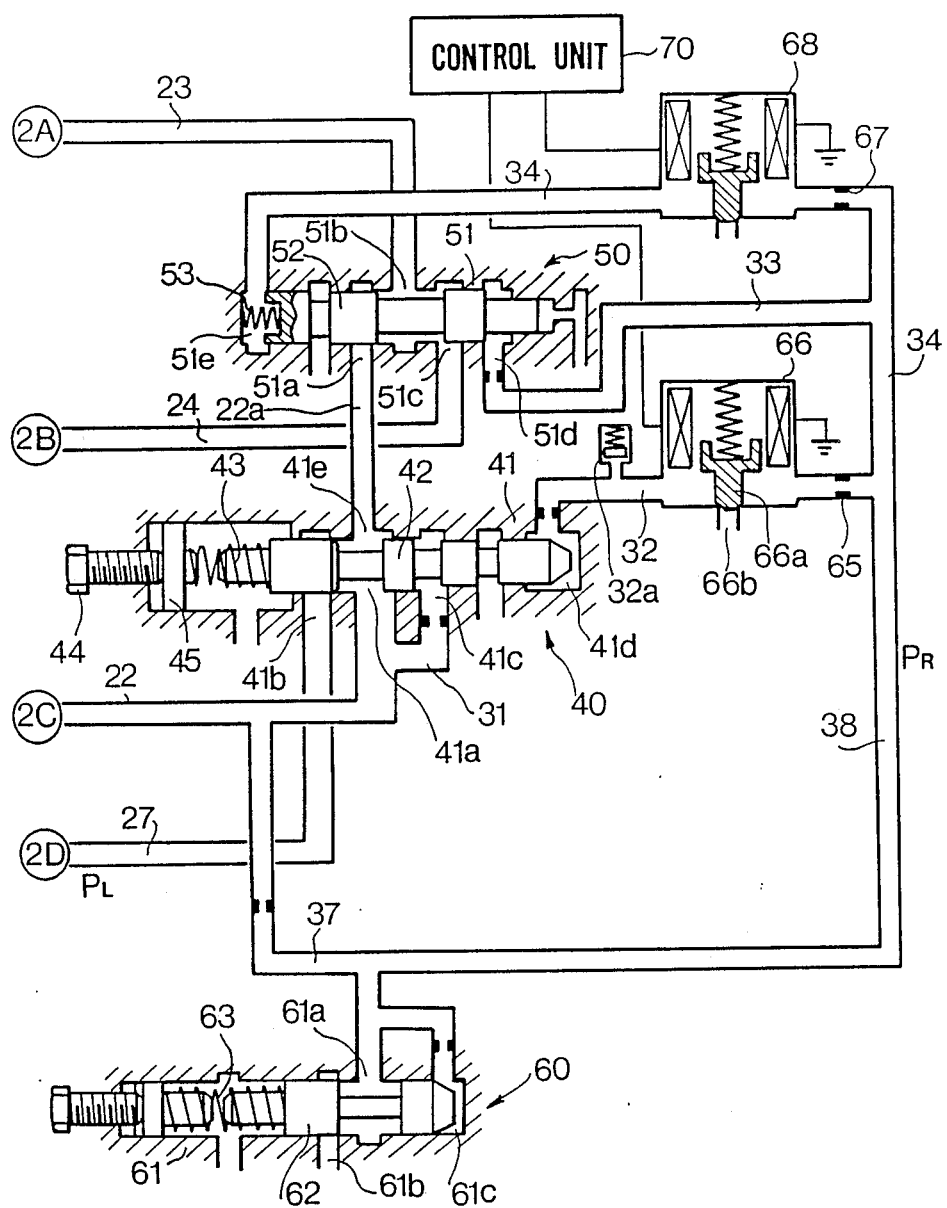

Referring to FIGS. 2a and 2b, chamber 9 of the drive pulley 7 is supplied with pressurized oil by an oil pump 21 from an oil reservoir 26 passing through a line pressure conduit 22, ports 41a and 41e of a line pressure control valve 40, transmission ratio control valve 50, and conduit 23. The chamber 10 of the driven pulley 8 is applied with pressurized oil through a passage 22b without passing through valves 40 and 50. The movable conical disc 7a of the drive pulley 7 is so designed that the pressure receiving area thereof is larger than that of the movable conical disc 8a of the driven pulley 8. The line pressure control valve 40 comprises a valve body 41, spool 42, and chambers 41c and 41d. The spool 42 is applied with pressure of the pressurized oil in the chamber 41c supplied through a conduit 31. The other end of the spool 42 is applied with the force of a spring 43 provided between the end of the spool 42 and a retainer 45, the position of which is adjustable by a screw 44. The port 41a is communicated with a drain port 41b for a drain passage 27 in accordance with the position of a land of the spool 42. The drain port 41b communicates with oil reservoir 26 through passage 27.

The transmission ratio control valve 50 comprises a valve body 51, spool 52, and a spring 53 for urging the spool 52 in the downshift direction. A port 51b of the valve body 51 is selectively communicated with a pressure oil supply port 51a or a drain port 51c in accordance with the position of lands of the spool 52. Port 51b communicates with chamber 9 through conduit 23, and port 51a communicates with port 41e of line pressure control valve 40 through conduit 22a. The drain port 51c is communicated with the oil resevoir 26 through a conduit 24 and a check valve 25.

The system is provided with a regulator valve 60, and solenoid operated on-off valves 66 and 68.

The regulator valve 60 comprises a valve body 61, an inlet port 61a connected to the pump 21 through passages 37 and 22, a spool 62, an end chamber 61c connected to the passage 37, and a spring 63 urging the spool 62 to the chamber 61c. When the pressure of oil in the chamber 61c becomes higher than a set value, the spool 62 is shifted to the left, so that an inlet port 61a communicates with a drain port 61b to drain the oil. Thus, a constant pressure of oil is provided in the passage 37.

The passage 37 is communicated with the chamber 41d of line pressure control valve 40 through a constant pressure passage 38, orifice 65, solenoid-operated on-off valve 66, and passage 32 having an accumulator 32a. Further, the passage 38 is communicated with an end chamber 51d of the transmission ratio control valve 50 through a passage 33, and with another end chamber 51e through an orifice 67, solenoid-operated on-off valve 68 and passage 34. The solenoid-operated on-off valve 66 is adapted to be operated by pulses. When energized, a valve 66a opens a drain port 66b. The pulsation of the pressure of oil in the passage 32 is smoothed by accumulator 32a. The solenoid-operated on-off valve 68 is the same as valve 66 in construction and operation. The valves 66 and 68 are operated by signals from a control unit 70. Thus, pressure controlled by the valves 66 and 68 is applied to chambers 41d and 51e.

In the transmission ratio control valve 50, the pressure receiving area of the spool 52 at chamber 51e is set to a value larger than the area at the chamber 51d. On the other hand, the control pressure in the chamber 51e can be changed between a maximum value, which is the same as the constant pressure in the chamber 51d, when the duty ratio is 0% and zero by controlling the duty ratio of the pulses for operating the valve 68. The transmission ratio control valve 50 is so arranged that the spool 52 is at a neutral position at a middle duty ratio (for example 50%) and is located in an oil supply position by increasing the duty ratio from the middle duty ratio because of a reduction of control pressure in the chamber 51e. Further, the speed of the movement of the spool 52 changes with the magnitude of changing of the duty ratio. The spool 52 is shifted to an oil drain position by decreasing the duty ratio. It will be understood that when the oil is supplied to the chamber 9, the transmission is upshifted.

Referring to FIG. 3, a drive pulley speed sensor 71, driven pulley speed sensor 72, engine speed sensor 73 and throttle position sensor (or intake manifold pressure sensor) 74 are provided. Output signals $N_p$ and $N_s$ of the sensors 71, 72 are fed to an actual transmission ratio calculator 75 to produce an actual transmission ratio i in accordance with $i = N_p/N_s$. The output signal $N_s$ and output signal $\theta$ representing the opening degree of the throttle position sensor 74 are fed to a desired transmission ratio calculator 76. The desired transmission ratio id is calculated by the calculator 76 in accordance with the signals $N_s$ and $\theta$. The desired transmission ratio id is fed to a transmission ratio changing speed calculator 78 through a correcting section 107. On the other hand, the output $\theta$ is fed to a throttle valve speed calculator 82 to obtain swinging speed $\dot\theta$ of the throttle valve. The signal of the speed $\dot\theta$ is supplied to a coefficient setting section 77 to produce a coefficient K. The actual transmisson ratio i, desired transmission ratio id and coefficient K from the coefficient setting section 77 are applied to transmission ratio changing speed calculator 78 to produce a transmission ratio changing speed di/dt from the formula $di/dt = K(id - i)$.

The speed di/dt and actual ratio i are applied to a duty ratio table 79 to derive the duty ratio D. The duty ratio D is supplied to the solenoid-operated valve 68 through a driver 80.

Further, the output signal $\theta$ of the throttle position sensor 74 and the output $N_e$ of engine speed sensor 73 are fed to an engine torque calculator 96, so that engine torque T is calculated based on throttle position 0 and engine speed Ne.

On the other hand, the actual transmission ratio i from the calculator 75 is applied to a necessary line pressure table 103 to derive a necessary line pressure $P_{LU}$ per unit torque. The necessary line pressure $P_{LU}$ and the engine torque T are applied to a desired line pressure calculator 104 where a desired line pressure $P_L$ is calculated.

The desired line pressure $P_L$ is applied to a duty ratio table 105 to derive a duty ratio $D_L$ corresponding to the desired line pressure $P_L$. The duty ratio $D_L$ is supplied to a driver 106 which operates the solenoid-operated on-off valve 66 at the duty ratio.

Figure 5:
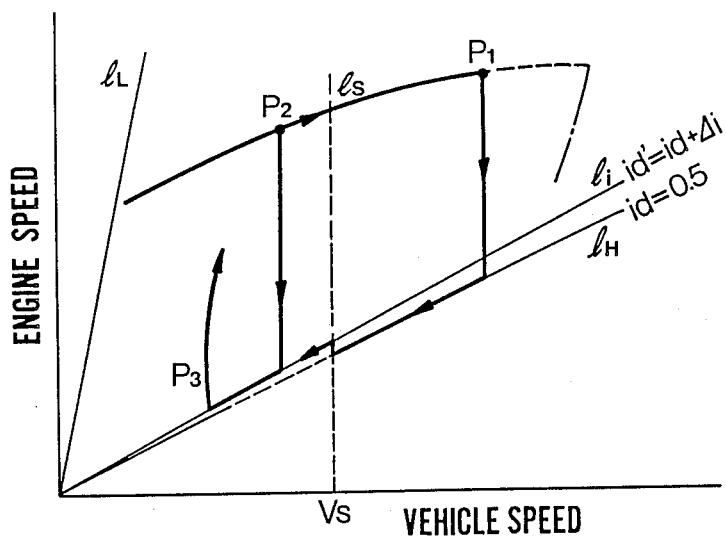
FIG. 5 is a graph showing a transmission characteristic of the control system of the invention.
Figure 6:
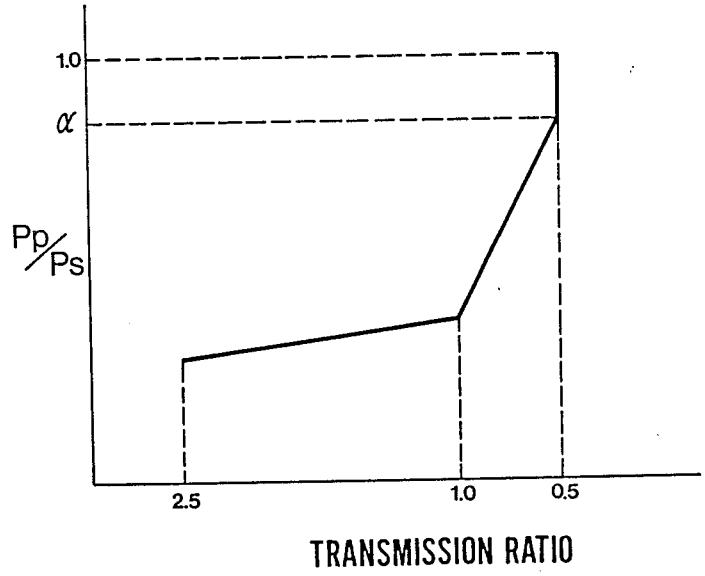
FIG. 6 is a graph showing the relationship between transmission ratio and oil pressure.

In the system of the present invention, a minimum transmission ratio detector 108 is provided to be applied with the output signal id of the desired transmission ratio calculator 76. The detector 108 produces an output signal when the desired transmission ratio from the calculator 76 becomes a minimum ratio (overdrive transmission ratio 0.5). A vehicle speed detector 109 is provided to produce an output signal, when the output signal of the driven pulley speed sensor 72, which represents the vehicle speed, is lower than a predetermined value Vs. The value Vs is selected to a value positioned at a substantially intermediate position of an entire vehicle speed range as shown in FIG. 5, in consideration of the fluctuation of the engine speed during the feedback control operation. Further, a correcting value setting section 110 is provided to produce a correcting value $\Delta i$ for slightly increasing the overdrive transmission ratio 0.5. The output signals of the detectors 108 and 109 and the correcting value $\Delta i$ from section 110 are applied to the correcting section 107 where the desired transmission ratio id, that is the overdrive transmission ratio, is corrected by adding the value $\Delta i$ (id'=id+$\Delta i$).

In operation, while the vehicle is at a stop, chamber 10 of the driven pulley 8 is supplied with line pressure through passage 22b, and the chamber 9 of the drive pulley 7 is drained, since $N_P$, $N_S$, $\theta$, and duty ratio D are zero, and the spool 52 is at the right end position and the drain port 51c communicates with the chamber 9 through the conduit 23 as shown in FIGS. 2a and 2b. Thus, in the pulley and belt device of the continuously variable belt-drive transmission, the driving belt 11 engages with the driven pulley 8 at a maximum running diameter to provide the largest transmission ratio (low speed stage). When the accelerator pedal is depressed, the clutch current increases progressively with an increase of engine speed. The electromagnetic clutch 2 is gradually engaged, transmitting the engine power to the drive pulley 7. The power of the engine is transmitted to the output shaft 6 at the largest transmission ratio by the driving belt 11 and driven pulley 8, and further transmitted to axles of the driving wheels 19. Thus, the vehicle is started. When the vehicle speed (output signal $N_s$) exceeds a predetermined value, the clutch 2 is entirely engaged.

At the start of the vehicle, the line pressure is at the highest value by the pressure control valve 40, since the duty ratio for the valve 66 is large, and the spool 42 of the control valve 40 is at the right end position. When the throttle valve is opened for acceleration, the desired transmission ratio id and transmission ratio changing speed di/dt are calculated by calculators 76, 78, and the duty ratio D for value 68 is obtained from the table 79. The value of the duty ratio D is larger than the neutral value, so that the pressure in the chamber 51d of the control valve 50 is higher than the chamber 51e. Thus, the spool 52 is shifted to the left to communicate the port 51a with port 51b, so that oil is supplied to the chamber 9 through the conduit 23.

On the other hand, the duty ratio for the valve 66 is reduced, thereby shifting the spool 42 of the valve 40 to the left. The port 41a communicates with the port 41b of the drain passage 27. Thus, line pressure reduces, and the transmission is upshifted to the desired transmission ratio id at the speed di/dt.

As the difference between the desired ratio id and actual ratio i becomes large, the duty ratio for the valve 68 becomes large, thereby increasing the shifting speed of the spool 52 to increase the actual transmission changing speed. When the opening degree of the throttle valve is reduced for deceleration, the duty ratio is reduced, thereby shifting the spool 52 to the right to drain the chamber 9. Thus, the transmission is downshifted. The transmission changing speed at downshifting increases with reducing of the duty ratio.

The control operation of line pressure will be described hereinafter. From the engine torque calculator 96, a torque T is obtained in accordance with throttle position $\theta$ and engine speed $N_e$, which is applied to the desired line pressure calculator 104. The calculator calculates a desired line pressure $P_L$. The solenoid-operated on-off valve 66 is operated at a duty ratio corresponding to the desired line pressure $P_L$. The line pressure is applied to chamber 10 to hold the belt 11 at a necessary minimum force, the transmitting torque at which is slightly larger than torque T. Thus, power is transmitted through the transmission without slipping of the belt.

In a high vehicle speed range higher than the speed Vs, the vehicle speed detector 109 does not produce the signal, so that the correction of the desired transmission ratio id is not performed at the correcting section 107. The desired transmission ratio id decreases with an increase of speed Ns of driven pulley. In accordance with the decrease of the desired transmission ratio, the actual transmission ratio i decreases. A line ls of FIG. 5 shows the relationship between the engine speed and vehicle speed, which represents also the reduction of the actual transmission ratio. When the accelerator pedal is released at a point P1 in a predetermined range of high engine speed and high vehicle speed, the desired transmission ratio is set to a value for the overdrive. Under the desired overdrive transmission ratio condition, the movable disc 7a of the drive pulley 7 is shifted to a maximum position, and the movable disc 8a is at minimum position and both discs are pressed against the positions. Thus, the actual transmission ratio is kept at a minimum value (overdrive). In such a state, the feedback control operation becomes ineffective, so that the transmission ratio is kept to the overdrive transmission ratio (0.5) without fluctuation. A line lH of FIG. 5 shows the variation at the overdrive transmission ratio (0.5). Since the transmission ratio does not fluctuate, the vehicle can be driven in stable engine operation.

Figure 4:
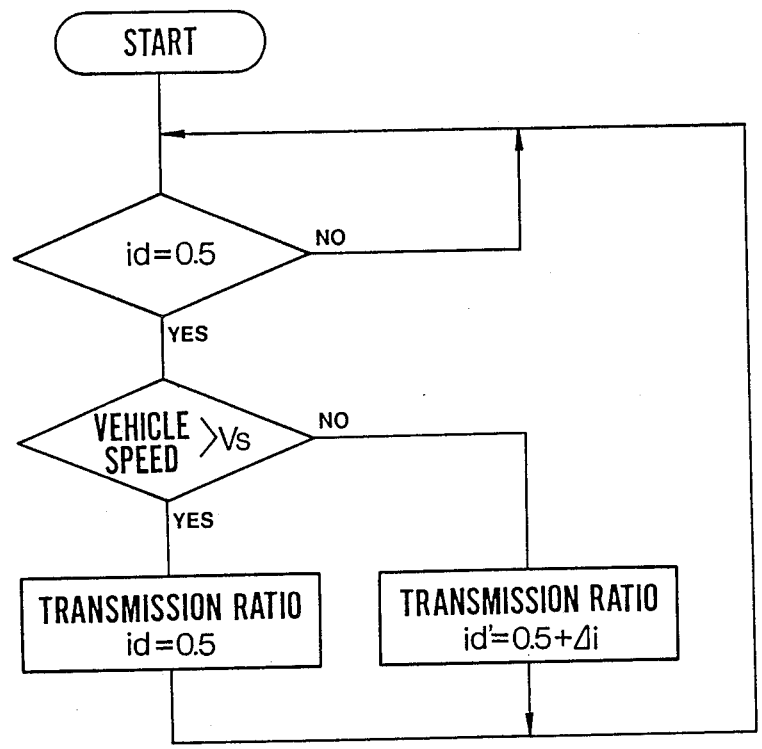
FIG. 4 is a flowchart showing the operation of the system.

When the vehicle speed reduces below the value Vs or the accelerator pedal is released at a point P2 in the low vehicle speed range under the condition of the desired overdrive transmission ratio, the vehicle speed detector 109 and detector 108 produce signals which are applied to the correcting section 107. Thus, the desired transmission ratio is corrected to a value which is slightly larger than the overdrive transmission ratio (id'=id+$\Delta i$). Accordingly, the actual transmission ratio is set to a sub-overdrive transmission ratio which corresponds to a line li of FIG. 5. Therefore, when the transmission ratio is increased, for example by kickdown of the accelerator pedal at a position P3, the transmission can be downshifted without delay. FIG. 4 shows the above-described operation.

While the presently preferred embodiment of the present invention has been shown and described, it is to be understood that this disclosure is for the purpose of illustration and that various changes and modifications may be made without departing from the spirit and scope of the invention as set forth in the appended claims.

What is claimed is:

1. In a control system for a continuously variable transmission for transmitting the power of an internal combustion engine to driving wheels of a motor vehicle through a clutch, the transmission having a drive pulley including a hydraulically shiftable disc and a first hydraulic cylinder for shifting the disc, a driven pulley including a hydraulically shiftable disc and a second hydraulic cylinder for operating the disc of the driven pulley, and a belt engaged with both pulleys, the control system including a transmission ratio control valve having ports and a shiftable spool, a first hydraulic circuit having a pump for supplying oil to the second hydraulic cylinder and to the first hydraulic cylinder through the transmission ratio control valve, the improvement in the system comprising:

first detecting means for detecting load on the engine and for producing a load signal;

first means responsive to the load signal for producing a desired transmission ratio signal, said desired transmission ratio signal including from time to time a desired overdrive transmission ratio signal;

second means responsive to the desired transmission ratio signal for shifting the spool of the transmission ratio control valve so as to provide a corresponding desired transmission ratio of the transmission;

second detecting means for detecting speed of the vehicle and producing a vehicle speed signal when the vehicle speed is in a low vehicle speed range which is lower than a predetermined speed;

third means responsive to the desired overdrive transmission ratio signal and to the vehicle speed signal for producing a corrected desired overdrive transmission ratio signal for the low vehicle speed range as the desired transmission ratio signal for the second means for shifting the spool of the transmission ratio control valve so as to provide a corresponding desired transmission ratio of the transmission, the corrected desired overdrive transmission ratio signal being larger in value than the desired overdrive transmission ratio signal.

2. The control system according to claim 1 wherein the second means includes a second hydraulic circuit for supplying oil to the transmission ratio control valve so as to shift the spool and control valve means provided in the second hydraulic circuit for controlling the amount of oil supplied to the transmission ratio control valve.

3. The control system according to claim 2 wherein the second hydraulic circuit is provided with a regulator valve for maintaining the pressure of oil at a constant value.

4. The control system as set forth in claim 1, wherein the third means produces the corrected desired overdrive transmission ratio signal larger than the desired overdrive transmission ratio signal in value in a high vehicle speed range which is higher than the predetermined speed, whereby an actual overdrive transmission ratio of the transmission is increased corresponding to the corrected desired overdrive transmission ratio in the low vehicle speed range.

5. The control system as set forth in claim 1, wherein the predetermined speed of the vehicle is substantially at an intermediate position of an entire vehicle speed range of the vehicle.

6. The control system as set forth in claim 1, wherein said third means comprises correcting value setting means for producing a correcting value for slightly increasing the desired overdrive transmission ratio signal to provide the corrected desired overdrive transmission ratio signal.

7. The control system as set forth in claim 6, wherein said correcting value setting means for producing a correcting value is for slightly increasing the desired overdrive transmission ratio signal by an incremental value of the transmission ratio to provide the corrected desired overdrive transmission ratio signal.

8. The control system as set forth in claim 1, wherein said third means includes a minimum transmission ratio detector for detecting when the desired transmission ratio signal represents a minimum transmission ratio as representing the desired overdrive transmission ratio signal.

9. The control system as set forth in claim 1, wherein said third means responds only to the desired overdrive transmission ratio signal and the vehicle speed signal for producing the corrected desired overdrive transmission ratio signal only for the low vehicle speed range.

* * * * *